(12) United States Patent
David et al.

(10) Patent No.: US 9,377,038 B2
(45) Date of Patent: Jun. 28, 2016

(54) SELF-ALIGNING COUPLER FOR SUPERPOSED SURFACES AND METHOD OF SELF-ALIGNING COUPLER FOR SUPERPOSED SURFACES

(71) Applicant: EMBRAER S.A., São José dos Campos/SP (BR)

(72) Inventors: Nilson Luiz David, São José dos Campos/SP (BR); Carlos Eduardo Coimbra Santos, São José dos Campos/SP (BR); Danielle David De Almeida, São José dos Campos/SP (BR)

(73) Assignee: EMBRAER S.A., São José Dos Campos (BR)

( * ) Notice: Subject to any disclaimer, the term of this patent is extended or adjusted under 35 U.S.C. 154(b) by 338 days.

(21) Appl. No.: 13/724,247

(22) Filed: Dec. 21, 2012

(65) Prior Publication Data
US 2013/0180096 A1    Jul. 18, 2013

(30) Foreign Application Priority Data
Dec. 22, 2001  (BR) ...................................... 1105325

(51) Int. Cl.
*B64C 3/50* (2006.01)
*F16B 5/00* (2006.01)
*B64C 1/26* (2006.01)
*B64C 9/02* (2006.01)

(52) U.S. Cl.
CPC ... *F16B 5/00* (2013.01); *B64C 1/26* (2013.01); *B64C 9/02* (2013.01); *Y10T 29/49947* (2015.01); *Y10T 403/75* (2015.01)

(58) Field of Classification Search
CPC ........ F16B 5/0216; F16B 5/025; F16B 43/02; B64C 3/50; B64C 2003/147; B64C 1/12
See application file for complete search history.

(56) References Cited

U.S. PATENT DOCUMENTS

| 1,380,347 | A | * | 6/1921 | Blume | 248/663 |
|---|---|---|---|---|---|
| 2,552,004 | A | * | 5/1951 | Erdman | 403/404 |
| 3,220,289 | A | * | 11/1965 | Farekas | 82/147 |
| 3,422,721 | A | * | 1/1969 | Yonkers | 411/369 |
| 4,398,691 | A | * | 8/1983 | Wilke | 248/235 |
| 4,406,474 | A | * | 9/1983 | Scharf | 280/154 |
| 4,594,026 | A | * | 6/1986 | Hauer et al. | 405/153 |
| 7,056,053 | B2 | * | 6/2006 | Schilling et al. | 403/337 |
| 2011/0293362 | A1 | * | 12/2011 | Blades | 403/270 |

* cited by examiner

*Primary Examiner* — Michael P Ferguson
(74) *Attorney, Agent, or Firm* — Nixon & Vanderhye P.C.

(57) ABSTRACT

Self-aligning couplers and methods for aligning superposed surfaces include a circular and semi-spherical base formed on a first surface, a fastening element perpendicularly passing through the circular and semi-spherical base and associated to a second surface, and at least a semi-spherical insert disposed on the circular and semi-spherical base and concentric to the fastening element. The semi-spherical insert is cooperative with the circular and semi-spherical base and the fastening element for the self-alignment and superposed fastening of the first and second surfaces.

4 Claims, 5 Drawing Sheets

SELF-ALIGNING COUPLER FOR SUPERPOSED SURFACES AND METHOD OF SELF-ALIGNING COUPLER FOR SUPERPOSED SURFACES

The present invention refers to a self-aligning coupler for superposed surfaces which enables the superposed fastening of parts eliminating the need to use wedge grips to adjust the parts during fastening and to a method of self-aligning coupler for superposed surfaces using a reduced quantity of components and reduced installment and maintenance time.

DESCRIPTION OF THE STATE OF THE ART

In the aeronautical industry, installing parts with superposed surfaces has required the use of adjustment wedges for the correct positioning of these parts. The need to use said wedges occurs due to two main factors: the first factor is the existence of manufacturing deviation in each part, on account of the manufacturing tolerance of the parts. The second factor is the occurrence of assembly deviations between the parts, in view of the very process of mounting them, which also occurs within the permitted tolerances. Accordingly, the combination of manufacturing deviations and assembly deviations generates the need to use adjustment wedges for the correct positioning of these parts.

In a particular case, the flap formed by a panel which moves on tracks inside the wing of a plane receives on its structure a movement car responsible for the displacement of this panel on specific tracks disposed in a compartment inside the wing.

This movement car is fixed to the flap panel; however, mainly on account of the accumulated manufacturing and assembly deviations of these parts involved and, also by virtue of the slightly curved geometry of the flap panel and the flat fastening structure of the movement car, this installation has required the use of wedges to guarantee firmness and to adjust the joining of the parts. These wedges are generally in the form of a grip and some are parallel. They are positioned on the free span formed on each fastening point between the movement car and the flap panel, so as to guarantee a perfect fit and positioning between the joined parts. Consequently, it is necessary to produce a high number of wedges with different sizes and shapes for each span or space formed at each point of joining, resulting in a large quantity of parts to be assembled and causing excessive assembly and maintenance time. Additionally, the height of the wedges is calculated based on the height of the spans formed making one wedge different to the other. This means that when there is a need to replace the movement car, the wedges used become inadequate for positioning adjustment of the new part, requiring calculation and manufacturing of new wedges.

Still relating to the different heights that are formed at the fastening points of the movement car on the flap panel, the wedges become specific for each fastening point, that is, there is no interchangeability of wedges between the fastening points of a same movement car, nor is there interchangeability of wedges when replacing a used movement car for a new one.

Another particular case is the fastening of the vertical stabilizer with the plane fuselage. In this case, the lower portion of the stabilizer which is fastened to the plane fuselage is flat whereas the fuselage and installation support for the vertical stabilizer whose surface facing the vertical stabilizer is also flat. Owing to the manufacturing and assembly deviation between the lower flat portion of the vertical stabilizer and the flat surface of said support, these superposed surfaces need to be aligned during installation, requiring the use of a plurality of wedge grips and in parallel combined with the fastening points of the stabilizer in the respective support installed in the fuselage. Therefore, in this fastening the same problems and the same drawbacks are noted as in the fastening of the movement car on the flap panel.

Document WO 2010/116168 describes a coupling assembly for joining two components, in an attempt to solve a problem of fastening parts in aircraft. However, the purpose of this assembly is to enable the fastening of two surfaces of adjacent parts, that is, disposed side by side and not superposed. In this case, the coupling is formed by a shaft connected to a first component and a bracket associated to a second component. This bracket comprises a mounting plate which is fixed to the component and an arm endowed with a through-bore and, by means of this bore, the arm and the bracket are fixed to the shaft joining the two components or the surfaces of the two adjacent components. To offset any gaps between the surfaces of these adjacent components, inside the through-bore of the bracket arm there are disposed washers and nuts with spherical surfaces. These washers and nuts combined guarantee adjustment compensation for the surfaces viewing a satisfactory alignment between them so as not to compromise the aerodynamics of the aircraft.

However, this state-of-the-art document discloses a specific coupling for surfaces of adjacent or coplanar components and further, they use a large quantity of parts to enable adjustment in fastening these components. The method and the parts used in this coupling cannot be applied to orthogonal, that is, superposed surfaces. Therefore, the coupling described in document WO 2010/116168 does not overcome the drawbacks noted in fastening the movement car on the surface of the flap panel and in fastening the stabilizer to the fuselage of an aircraft.

OBJECTIVES OF THE INVENTION

The objective of the present invention is to provide a self-aligning coupler for superposed surfaces so as to enable the superposed fastening of parts eliminating the need to use wedge grips to adjust the parts during fastening.

Another objective of this invention is to provide a method of self-aligning coupler for superposed surfaces using a reduced quantity of components and a reduced installment and maintenance time.

BRIEF DESCRIPTION OF THE INVENTION

The object of the invention is a self-aligning coupler for superposed surfaces comprising: a circular and semi-spherical base formed on a first surface; a fastening element perpendicularly passing through the circular and semi-spherical base and associated to a second surface; and at least a semi-spherical insert disposed on the circular and semi-spherical base and concentric to the fastening element. Said semi-spherical insert being cooperative with the circular and semi-spherical base and the fastening element for the self-alignment and fastening of the first and second superposed surfaces.

Another object of this invention is a method of self-aligning coupler for superposed surfaces which comprises the steps of:

a) formation of a circular and semi-spherical base on a first surface;

b) disposition of a fastening element perpendicularly passing through the circular and semi-spherical base;

c) positioning of at least a semi-spherical insert on the circular and semi-spherical base and concentric to the fastening element;

d) application of a tightening force to the fastening element; and e) self-alignment and fastening of the first surface superposed the second surface by compensation and adjustment between the circular and semi-spherical base and at least a semi-spherical insert.

BRIEF DESCRIPTION OF THE DRAWINGS

The present invention will now be described in greater detail based on an exemplary execution represented in the drawings. The drawings show.

DETAILED DESCRIPTION OF THE DRAWINGS

The present invention refers to a self-aligning coupling used to fasten superposed surfaces.

Figure 1:
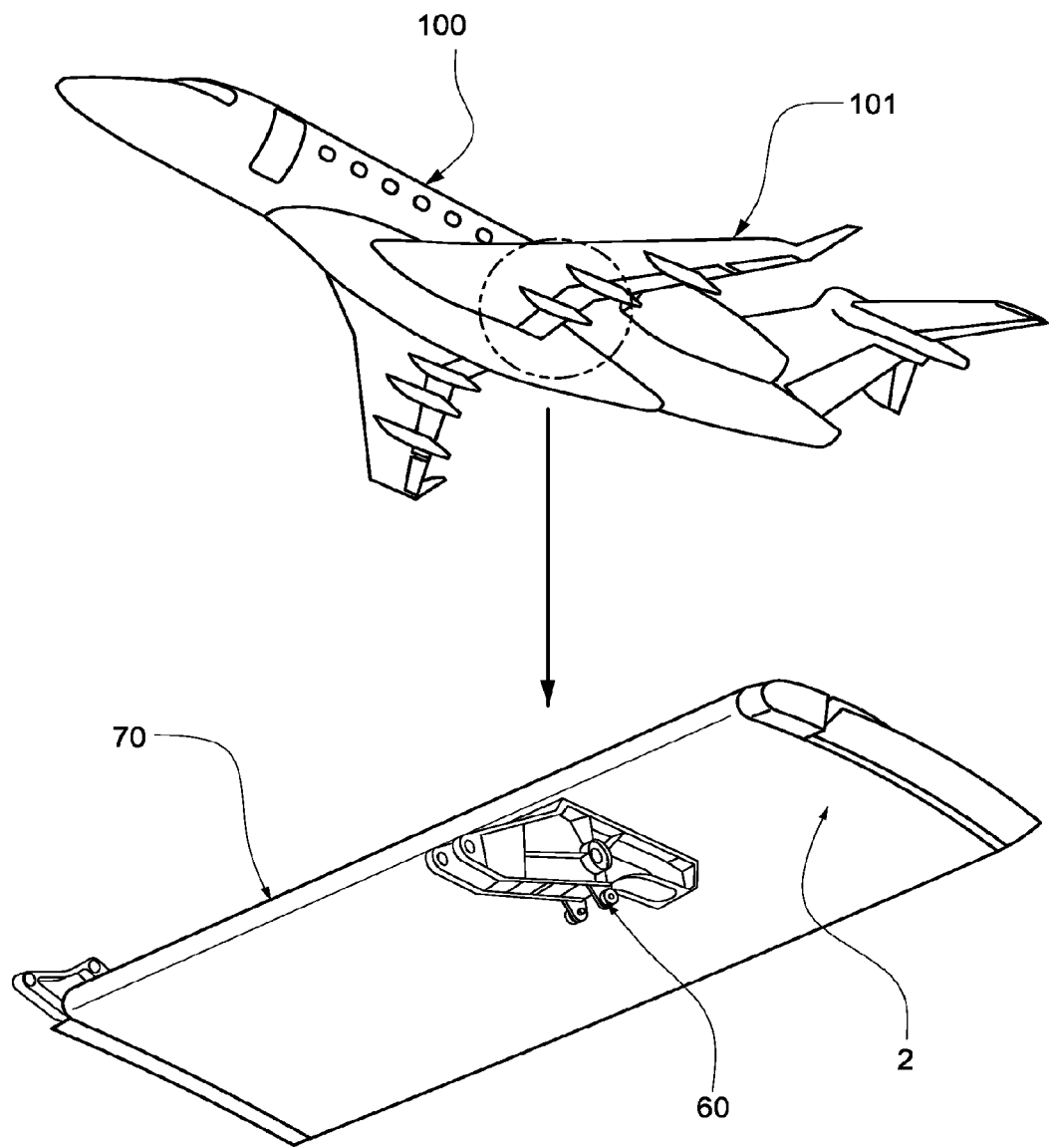
FIG. 1—illustrates an aircraft and a part of its structure which comprises a first arrangement of the self-aligning coupler for superposed surfaces, which is the object of this invention.

In a first preferred embodiment, the superposed surfaces consist of structural parts of an aircraft 100, as illustrated in FIG. 1. These structural parts correspond, in an exemplary manner, to the flap panel 70 positioned inside the wing 101 of the aircraft 100 and which moves along tracks (not illustrated) also positioned inside the wing 101 of the aircraft 100. To achieve this movement, the flap panel 70 comprises a movement car 60 fixed superposedly to the lower surface of this panel 70, hereinafter referred to as second surface 2.

This second surface 2 presents a slightly curved geometry as can be seen in FIG. 1, whereas, according to FIGS. 2 and 3, the fastening surface of the movement car 60 on the flap panel 70, hereinafter referred to as first surface 1, presents a flat geometry.

So that the first surface 1 may be fixed superposedly to the second surface 2, the self-aligning coupler is used for superposed surfaces that are the object of this invention.

Figure 4:
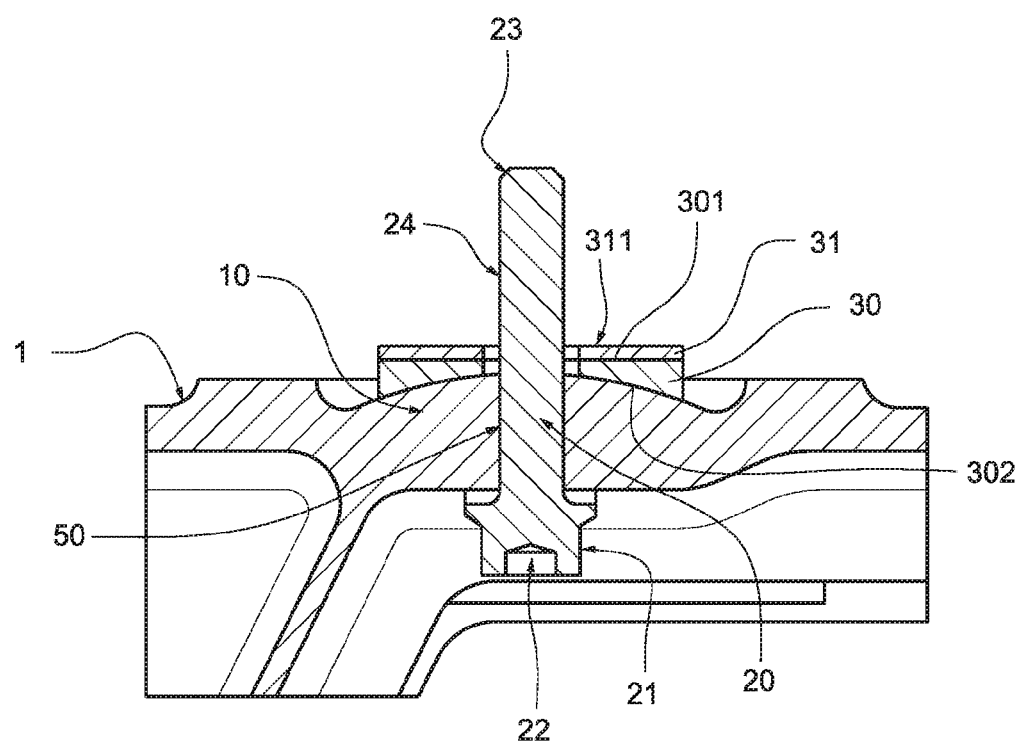
FIG. 4—is a detailed view of the self-aligning coupler for superposed surfaces, which is the object of this invention.

As illustrated in FIG. 4, the self-aligning coupler for superposed surfaces comprises a circular and semi-spherical base 10 formed on the first surface 1. More precisely, this circular and semi-spherical base 10 is formed at fastening points 5 of the first surface 1 to which this first surface 1 will be fastened superposedly to the second surface 2 (FIG. 2 and FIG. 1).

Further according to FIG. 4, the self-aligning coupler for superposed surfaces also comprises a fastening element 20 which is perpendicularly passing through the circular and semi-spherical base 10 and associated to the second surface 2, and at least a semi-spherical insert 30 disposed on the circular and semi-spherical base 10 and concentric to the fastening element 20.

A circular and semi-spherical base 10 comprises a through-bore 50 which receives the fastening element 20. This fastening element 20 comprises a main end 21 containing a tightening element 22 and disposed in an appropriate orifice disposed on the first surface 1. It also comprises a secondary end 23 which is inserted into the second surface 2 also in an appropriate orifice or hole and a mid-portion 24 positioned at the circular and semi-spherical base 10. Therefore, this fastening element 20 may consist of a screw, threaded pin or other equivalent fastening element, and acts as a guide and element for joining the parts of interest.

The semi-spherical insert 30 is cooperative with the circular and semi-spherical base 10 and the fastening element 20 for the self-alignment and fastening of the first and second surfaces 1, 2 superposedly. This semi-spherical insert 30 is made of metal material, and may be replaced by polymer or composites, provided they fulfill the same function. Said semi-spherical insert 30 presents a circular format comprising a flat portion 301 facing the second surface 2 and a semi-spherical portion 302, having the same curvature as the circular and semi-spherical base 10, facing the circular and semi-spherical base 10 (FIG. 4).

The semi-spherical insert 30 further comprises a central through-bore 303 (FIG. 2) having a diameter coinciding with or close to the diameter of the fastening element 20 such that the semi-spherical insert 30, when positioned on the circular and semi-spherical base 10 and concentric to the fastening element 20.

Figure 2:
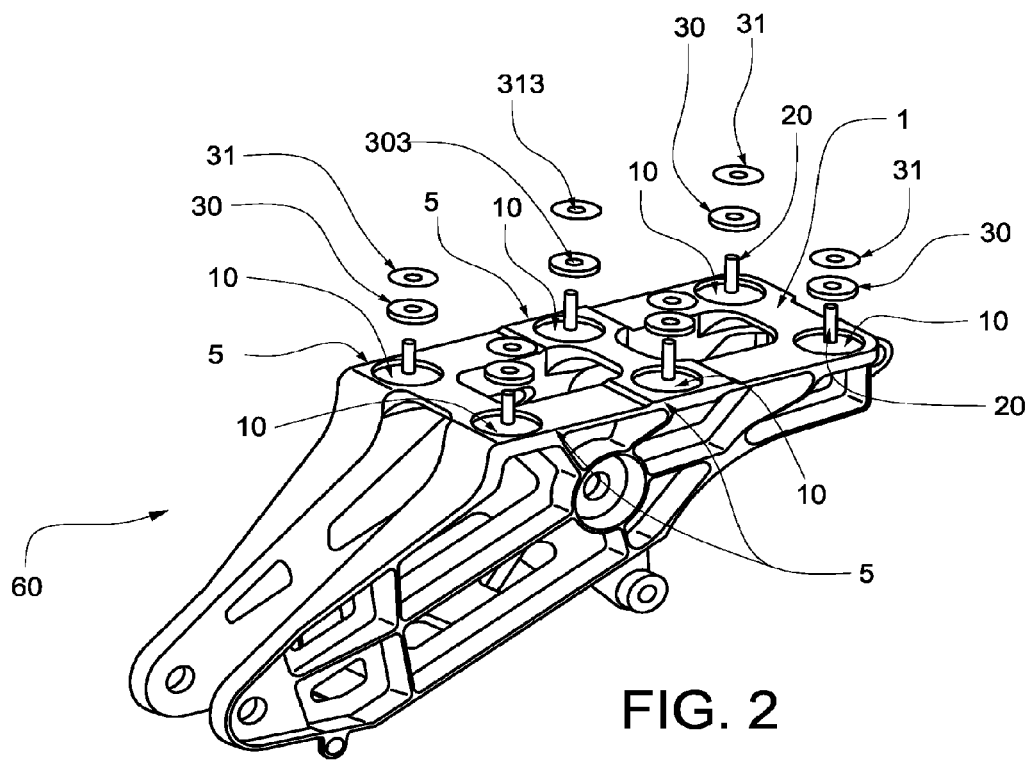
FIG. 2—is a first perspective view of a movement car of a flap panel indicated in FIG. 1, comprising a surface endowed with a plurality of self-aligning couplings for superposed surfaces, which is the object of this invention.
Figure 3:
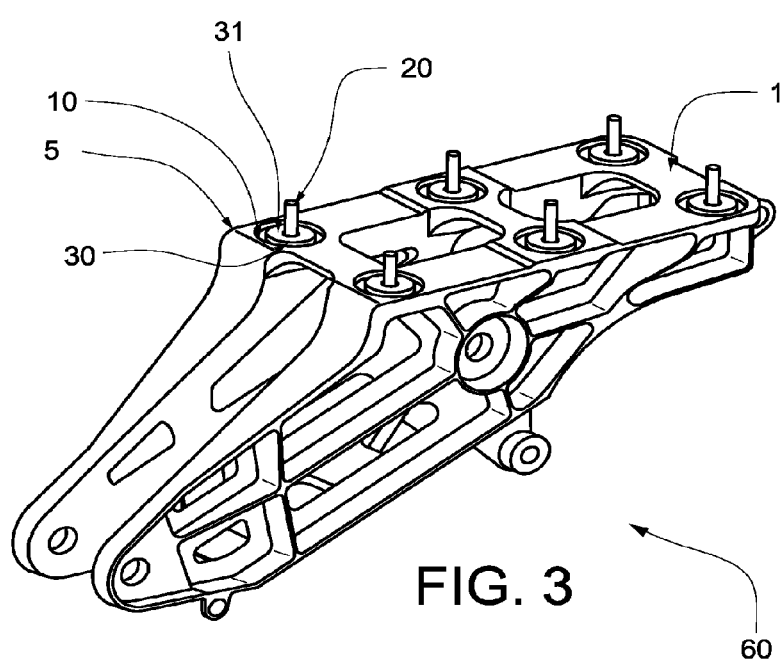
FIG. 3—is a second perspective view of a movement car of a flap panel indicated in FIG. 1, comprising a surface endowed with a plurality of self-aligning couplings for superposed surfaces, which is the object of this invention.

On the semi-spherical insert 30 there is optionally disposed at least a parallel insert 31 formed by flat portions 311 parallel to each other (FIG. 4) and a central through-bore 313 (FIG. 2). The external diameter of this parallel insert 31 coincides with the external diameter of the semi-spherical insert 30 and, in the same way, the through-bores of the parallel insert 31 and the semi-spherical insert 30 coincide such that, if necessary, one or more parallel inserts 31 are concentrically inserted into the fastening element 20 and supported on the flat portion 301 of the semi-spherical insert 30.

The part that comprises a first surface 1, in this exemplary case the movement car 60, is positioned on the second surface 2, in this exemplary case the surface of the flap panel 70, such that the fastening points 5 of the first surface 1 are aligned to the fastening bores (not illustrated) disposed on the second surface 2. The first surface 1 is flat, whereas the second surface 2 presents a slightly curved geometry. This way, the contact points of the first surface 1 with the second surface 2 are the semi-spherical and circular bases 10 formed at the fastening points 5 of the first surface and the semi-spherical inserts 30 and parallel inserts 31 that are between the semi-spherical and circular bases 10 and the second surface 2, as illustrated in FIG. 3. The fastening elements 20 are then inserted into the through-bores of the semi-spherical and circular bases 10, of the semi-spherical inserts 30 and of the parallel inserts 31 such that the main ends 21 of the fastening elements 20 are housed in the part that comprises the first surface 1 and the secondary ends 23 are inserted into the fastening bores (not illustrated) of the second surface 2.

When tightening the fastening elements 20 by way of the tightening element 22, the semi-spherical inserts 30 and parallel inserts 31 cooperate together and with the semi-spherical and circular bases 10 providing a self-alignment and fastening of the first surface 1 superposed on the second surface 2.

This self-alignment occurs by virtue of the semi-spherical inserts 30 which adjust to the semi-spherical and circular bases 10 providing compensation for the geometric differences of the part and a suitable and firm setting, enabling the surfaces to be fastened superposedly. The parallel inserts 31, when necessary, also assist this compensation and cooperate to fasten the parts. Accordingly, these semi-spherical 30 and parallel 31 inserts may present constant measurements, there being no need for a specific calculation for each span formed between the first surface 1 and second surface 2 on account of the differences that occur chiefly because of the manufacturing deviations and assembly deviations.

Figure 5:
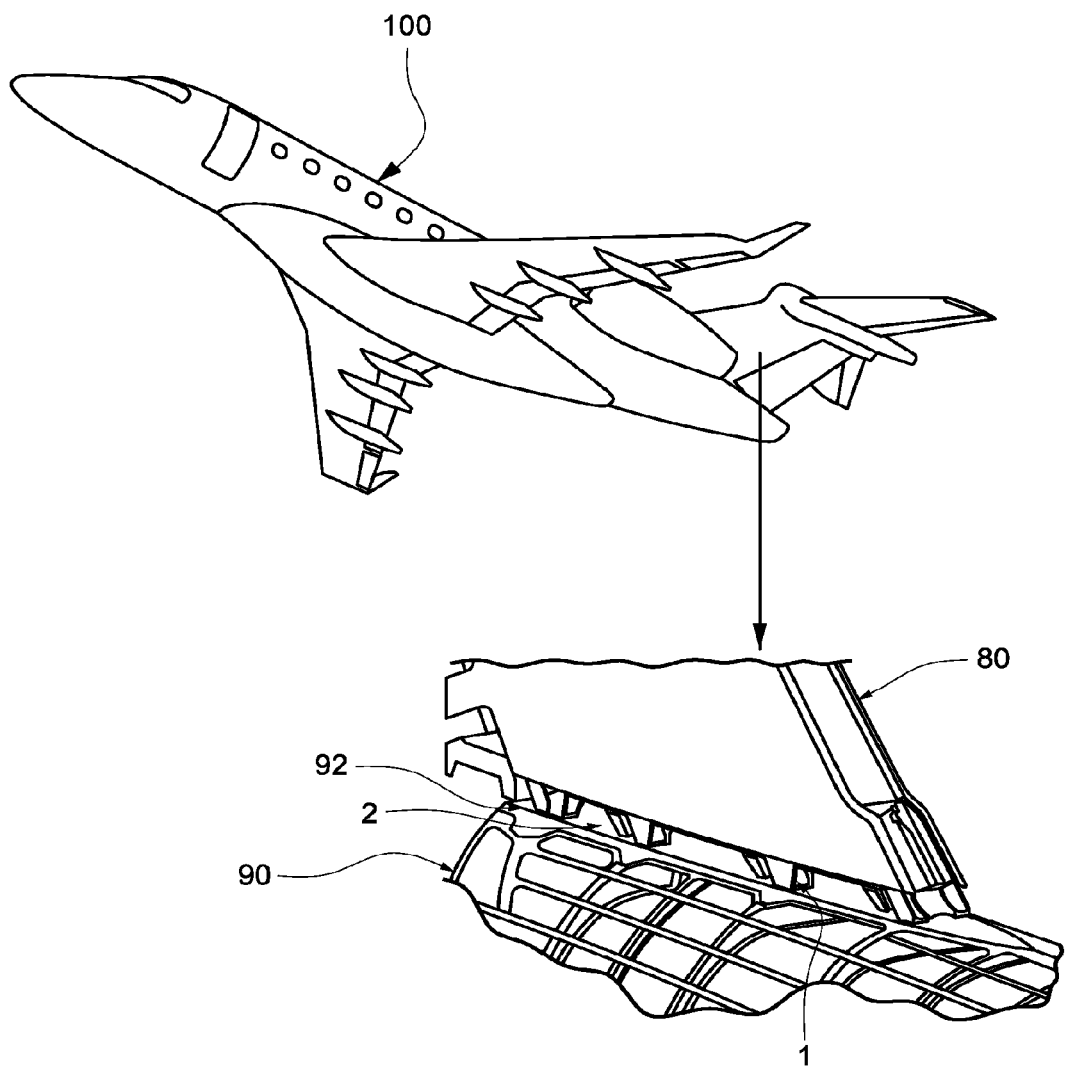
FIG. 5—illustrates an aircraft and another part of its structure that comprises a second arrangement of the self-aligning coupler for superposed surfaces, which is the object of this invention.

In a second preferred embodiment, the superposed surfaces also consist of structural parts of an aircraft 100, as illustrated in FIG. 5. These structural parts correspond to the vertical stabilizer 80 positioned in the rear portion of the aircraft 100, fastened to the fuselage 90 of the aircraft 100.

Figure 6:
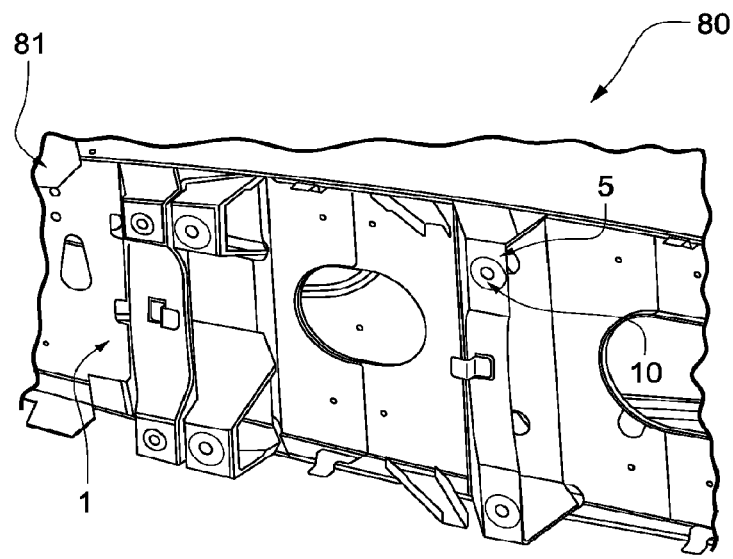
FIG. 6—illustrates the lower portion of the stabilizer indicated in FIG. 5, endowed with a plurality of self-aligning couplings for superposed surfaces, which is the object of this invention.
Figure 7:
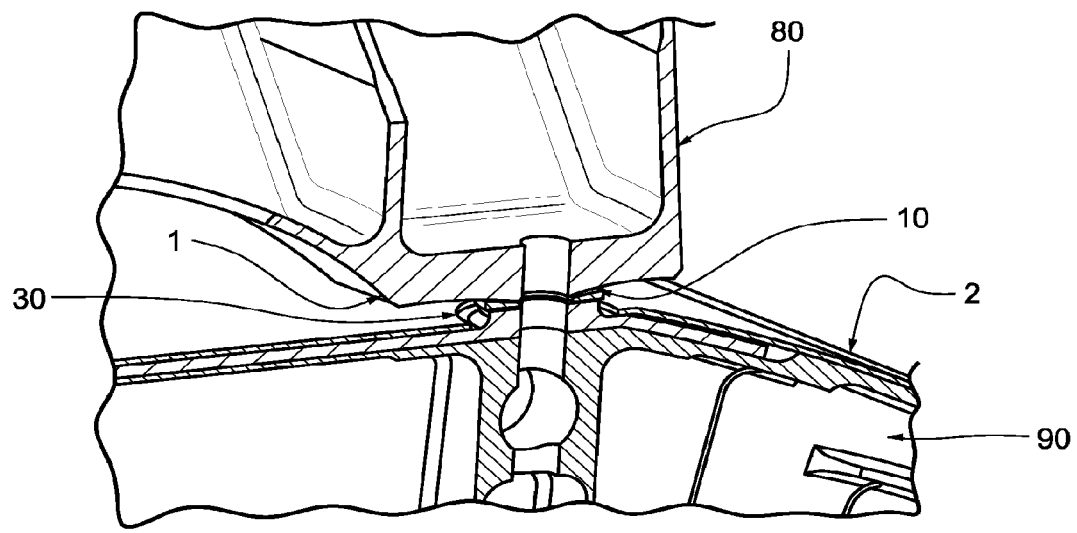
FIG. 7—is a detailed view of the stabilizer fixed to the aircraft fuselage by way of the self-aligning coupler for superposed surfaces, which is the object of this invention.

As illustrated in FIG. 6, the stabilizer 80 comprises a lower portion 81 formed by a first flat surface 1 which is fastened superposedly to the fuselage 90 endowed with an installation support for the vertical stabilizer 92 (FIG. 5) which is endowed with a second flat surface 2.

So that the first surface 1 of the stabilizer 80 can be fastened superposedly to the second surface 2 of the support 92 of the fuselage 90, the self-aligning coupler is used for superposed surfaces the object of this invention.

The self-aligning coupler for superposed surfaces used for this second preferred embodiment is as described above for the first preferred embodiment and illustrated in FIG. 4.

In this case, a semi-spherical circular base 10 is formed on the first surface 1 of the stabilizer 80 and comprises the same characteristics as described above. Therefore, the part that comprises the first surface 1, in this exemplary case the stabilizer 80, is positioned over the second surface 2, in this exemplary case the surface of the support 92 of the fuselage 90, such that the fastening points 5 of the first surface 1 (FIG. 6) are aligned with the fastening bores (not illustrated) disposed on the second surface 2. The first surface 1 and the second surface 2 are flat.

Accordingly, as described for the first preferred embodiment, the contact points of the first surface 1 with the second surface 2 are the semi-spherical and circular bases 10 formed at the fastening points 5 of the first surface and the semi-spherical inserts 30 and parallel inserts 31 that are between the semi-spherical and circular bases 10 and the second surface 2. The fastening elements 20 are then inserted into the through-bores of the semi-spherical and circular bases 10, of the semi-spherical inserts 30 and of the parallel inserts 31 such that the main ends 21 of the fastening elements 20 are housed in the part that comprises the first surface 1 and the secondary ends 23 are inserted into the fastening bores (not illustrated) of the second surface 2.

When tightening the fastening elements 20 by way of the tightening element 22, the semi-spherical inserts 30 and parallel inserts 31 cooperate together and with the semi-spherical and circular bases 10 providing a self-alignment and fastening of the first surface 1 superposedly on the second surface 2. This self-alignment occurs by virtue of the semi-spherical inserts 30 which adjust to the semi-spherical and circular bases 10 providing compensation for the geometric differences of the part and a suitable and firm setting, enabling the surfaces to be fastened superposedly. The parallel inserts 31, when necessary, also assist this compensation and cooperate to fasten the parts. Accordingly, these semi-spherical 30 and parallel 31 inserts may present constant measurements, there being no need for a specific calculation for each span formed between the first surface 1 and second surface 2 on account of the geometric difference of the parts.

The present invention also refers to a method of self-aligning coupler for superposed surfaces.

This method of self-aligning coupler for superposed surfaces comprises the steps of:

a) formation of a circular and semi-spherical base 10 on a first surface 1;

b) disposition of a fastening element 20 perpendicularly passing through the circular and semi-spherical base 10;

c) positioning of at least a semi-spherical insert 30 on the circular and semi-spherical base 10 and concentric to the fastening element 20;

d) application of a tightening force to the fastening element 20; and e) self-alignment and fastening of the first surface 1 superposedly on the second surface 2 by way of compensation and adjustment between the circular and semi-spherical base 10 and at least a semi-spherical insert 30.

The formation step and the circular and semi-spherical base 10 on the first surface 1 is carried out by industrial processes known in the state of the art, such as turning or stamping, for example, however, the disposition of the circular and semi-spherical base 10 on a first surface 1 is essential so that the self-aligning coupler for superposed surfaces occurs in a satisfactory manner.

After the positioning of the semi-spherical and circular bases 10 of the surface 1, the fastening elements 20 are disposed perpendicularly through the through-bores 50 which each circular and semi-spherical base 10 comprises, such that the main ends 21 of the fastening elements 20 are housed in the part that comprises the first surface 1 and the mid-portions 24 of the tightening elements 20 are positioned at the semi-spherical and circular bases 10, freeing the secondary ends 23 of the tightening elements 20 that will be inserted on the second surface 2 into appropriate orifices or bores.

Before the step of inserting the secondary ends 23 of the tightening elements 20 on the second surface 2 there occurs the step of positioning of at least a semi-spherical insert 30 on the semi-spherical and circular bases 10 and concentrically to the fastening elements 20 on account of the through-bore 303 that the semi-spherical inserts 30 present. The disposition of these semi-spherical inserts 30 is made such that the semi-spherical portion of the semi-spherical inserts 30 are positioned on the semi-spherical portion of the semi-spherical and circular bases 10 and the parallel portion 301 of the semi-spherical inserts 30 face the second surface 2.

Optionally there occurs the step of positioning at least a parallel insert 31 on at least a semi-spherical insert 30 in the circular and semi-spherical base 10. This step occurs when the geometry difference between the part that comprises the first surface 1 and the part that comprises the second surface 2 requires the use of said parallel insert 31. The quantity of parallel inserts 31 used also varies according to the geometries of the parts involved. The parallel insert 31 is disposed on the semi-spherical insert 30 so that it is positioned on the parallel portion 301 of the semi-spherical insert 30.

Once positioned the semi-spherical inserts 30 and parallel inserts 31 on the semi-spherical and circular bases 10 and the fastening elements 20 being disposed through the semi-spherical and circular bases 10 and through the semi-spherical 30 and parallel 31 inserts, the secondary ends 23 of the tightening elements 20 are inserted on the second surface 2 into appropriate orifices or bores (not illustrated).

Next is the step of applying a tightening force to the fastening element 20 of each circular and semi-spherical base 10. With the tightening force applied, there occurs simultaneously the step of self-alignment and fastening of the first surface 1 superposedly on the second surface 2 by way of compensation and adjustments between the circular and semi-spherical base 10 and at least a semi-spherical insert 30.

This adjustment compensates for the differences between these parts to be fixed superposedly, which occur mainly due to manufacturing deviations and assembly deviations of these parts.

The self-aligning coupler for superposed surfaces and the method of self-aligning coupler for superposed surfaces that are the objects of this invention enable parts to be fastened superposedly using a reduced quantity of parts. A significant reduction is thus noted in the time for installing the parts, which results in greater productivity on the assembly line.

Additionally, there is also a reduction in maintenance time since it no longer makes use of a plurality of wedges, each having a specific size and position. In other words, the present invention guarantees interchangeability of the parts when they have to be replaced or repaired.

Another significant advantage of the self-aligning coupler for superposed surfaces is the self-alignment during the assembly of the parts, reliably and simply compensating for the differences in tolerance of the parts involved.

Although the preferred embodiments described herein refer to the fastening of aircraft parts, other types of superposed parts from various industrial sectors may comprise the self-aligning coupler for superposed surfaces that are the object of this invention, and also make use of the method of self-aligning coupler for superposed surfaces that is the object of the present invention.

Lastly, within the scope of the present invention, the expression "self-alignment and fastening of the first surface superposedly on the second surface" refers to the fastening and self-alignment of two surfaces that are superposed, regardless of which surface is at a higher level, that is, regardless of which surface is higher than the other.

Having described an example of a preferred embodiment, it should be understood that the scope of the present invention encompasses other possible variations, being limited only by the content of the accompanying claims, potential equivalents being included therein.

The invention claimed is:

1. An assembly of parts comprising:
    first and second superposed parts coupled together along respective first and second superposed surfaces thereof; and
    a self-alignment assembly for self-alignment coupling of the first and second parts at the first and second superposed surfaces thereof, respectively, wherein:
    the self-alignment assembly comprises plural sets of self-aligning couplers operatively associated with the first part for respectively aligning the first and second superposed surfaces during coupling the first and second parts one to another, wherein each of the self-aligning couplers comprises:
    (i.) a circular base formed on and recessed in the first superposed surface of the first part, the circular base including a centrally located semi-spherical convex base surface;
    (ii.) a through-bore extending perpendicularly through the semi-spherical convex base surface of the circular base;
    (iii.) a fastening element perpendicularly passing through the through-bore and extending beyond the semi-spherical convex base surface of the circular base sufficiently to engage the second superposed surface of the second part;
    (iv.) a circular semi-spherical insert member including a semi-spherical concave alignment surface which conformably mates and is opposingly positioned on the semi-spherical convex base surface of the circular base so as to concentrically surround the fastening element, and a flat surface opposite to the semi-spherical concave alignment surface in facing relationship to the second superposed surface of the second part; and
    (v.) at least one circular parallel insert member having an opposed pair of planar engagement surfaces concentrically surrounding the fastening element positioned between the flat surface of the circular semi-spherical insert member and the second superposed surface of the second part, wherein:
    (vi.) the semi-spherical concave alignment surface of the semi-spherical insert member cooperatively engages the semi-spherical convex base surface of the circular base to self-align the superposed first and second surfaces in response to coupling of the superposed first and second parts by the fastening element.

2. The assembly as claimed in claim 1, wherein the first surface includes a plurality of fastening points for fastening the superposed first and second surfaces to one another, and wherein the semi-spherical convex base portion of the circular base of each of the self-aligning couplers is positioned at a respective one of the fastening points.

3. The assembly as claimed in claim 1, wherein the fastening elements comprise a main head at one end thereof which includes a tightening surface element and which is disposed on the first surface, a secondary end which is inserted into the second surface and a mid-portion which is positioned at the semi-spherical convex base portion of the circular base.

4. The assembly as claimed in claim 1, wherein the plural sets of self-aligning couplers are positioned on the first part in longitudinally arranged pairs thereof.

* * * * *